United States Patent
Ranmuthu

(10) Patent No.: US 6,831,800 B2
(45) Date of Patent: Dec. 14, 2004

(54) BOOST SYSTEM AND METHOD TO FACILITATE DRIVING A LOAD

(75) Inventor: Indumini Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 246 days.

(21) Appl. No.: 10/270,925

(22) Filed: Oct. 15, 2002

(65) Prior Publication Data

US 2004/0070862 A1 Apr. 15, 2004

(51) Int. Cl.$^7$ ................................................. G11B 5/02
(52) U.S. Cl. .............................. 360/68; 360/66; 360/61
(58) Field of Search ............................ 360/46, 67, 68, 360/66, 61; 327/108, 110, 494, 530

(56) References Cited

U.S. PATENT DOCUMENTS

| | | | |
|---|---|---|---|
| 5,869,988 A | * | 2/1999 | Jusuf et al. ................. 327/110 |
| 6,191,643 B1 | | 2/2001 | Nayebi et al. |
| 6,236,246 B1 | | 5/2001 | Leighton et al. |
| 6,252,440 B1 | | 6/2001 | Sushihara et al. |
| 6,373,298 B1 | | 4/2002 | Teterud et al. |
| 6,429,987 B1 | | 8/2002 | Cheng |

* cited by examiner

Primary Examiner—Alan T. Faber
(74) Attorney, Agent, or Firm—W. Daniel Swayze, Jr.; W. James Brady; Frederick J. Telecky, Jr.

(57) ABSTRACT

A system and method enable boosting a bias applied to a load so as to facilitate reversing the direction of the bias applied relative to the load. The amount of boosting provided to facilitate reversing the bias polarity, depends on a substantially fixed boost voltage, which can be programmable. Thus, by setting the boost voltage to a predetermined voltage improved performance can be achieved, including, for example, improving the rise and/or fall times of bias current applied to an inductive load.

25 Claims, 6 Drawing Sheets

BOOST SYSTEM AND METHOD TO FACILITATE DRIVING A LOAD

TECHNICAL FIELD

The present invention relates generally to electrical circuits and, more particularly, to a system and method to boost an input bias to facilitate driving a load.

BACKGROUND OF THE INVENTION

A hard disk drive system generally includes one or more rotating disks or platters on which data is stored as a sequence of magnetically polarized regions on the surface of the disk. An associated read/write head is associated with each surface of the disk on which data can be stored. The read/write head includes a small coil (or winding) of wire through which current flows to read or write data relative to the disks.

For example, a write head employs an inductive coil, which is selectively energized to generate magnetic fields that form magnetic patterns on the surface of the disk representing binary data (e.g., ones and zeros). The orientation of the patterns depends on the direction of electrical current flow through the inductive coil. That is, writing binary data entails selectively changing, or reversing, the direction of current flow through the head.

The direction of current flow through the coil is the controlled by a preamplifier, often referred to as a write driver. In order to write data, the write driver drives electric current through the inductive write head to create a temporary magnetic field that magnetizes a small region of the disk at the present position of the write head.

The write driver reverses current through the head based on a command signal from associated controls, which represents the data to be stored. The speed at which data can be stored is determined, at least in part, according to how fast the current through the write head can be reversed in response to the bit pattern of the command signal. It is desirable to facilitate the reversal of current through the head, so as to increase the speed at which data can be stored on the magnetic storage medium. The faster data can be stored on the rotating disk also enables an increase in the data density, as magnetically polarized regions on the disk surface can be packed more closely together.

Various approaches have been employed in efforts to improve the speed of reversing write current through an inductive head. Such approaches, however, have not been completely satisfactory; often providing either complex or inflexible solutions.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to boosting biasing of a load so as to facilitate reversing the direction (e.g., a polarity change) of the biasing relative to the load. For example, the system can control boost current (e.g., overshoot or undershoot) applied to the load so as to improve the rise or fall time associated with reversing the load current. The amount of boosting can be programmable, for example, by setting an adjustable boost voltage that is used to bias the boost current applied for a duration associated with each reversal of current through the load. The duration of the boosting also can be programmable. The present approach thus is flexible, as it can be adapted to help improve performance of various driver systems (e.g., write drivers), including those implemented with various different configurations of write heads or control circuitry.

Another aspect of the present invention relates generally to a methodology to facilitate reversing a direction of write current through a write head. Such methodology applies desired boosting based on a programmable boost voltage in response to reversing direction of the write current through a write head. The direction of the boosting depends on the direction change of the write current relative to the write head.

BRIEF DESCRIPTION OF THE DRAWINGS

The foregoing and other aspects of the present invention will become apparent to those skilled in the art to which the present invention relates upon reading the following description with reference to the accompanying drawings.

DETAILED DESCRIPTION

The present invention relates generally to boosting biasing of a load so as to facilitate reversing the direction (e.g., a polarity change) of the biasing relative to the load. For example, the system can control boost current applied to the load so as to improve the rise or fall time associated with a reversal in the load current. The amount of boosting can be programmable, for example, by setting an adjustable boost voltage that is employed to bias a boost current associated with reversing current through the load.

Figure 1:
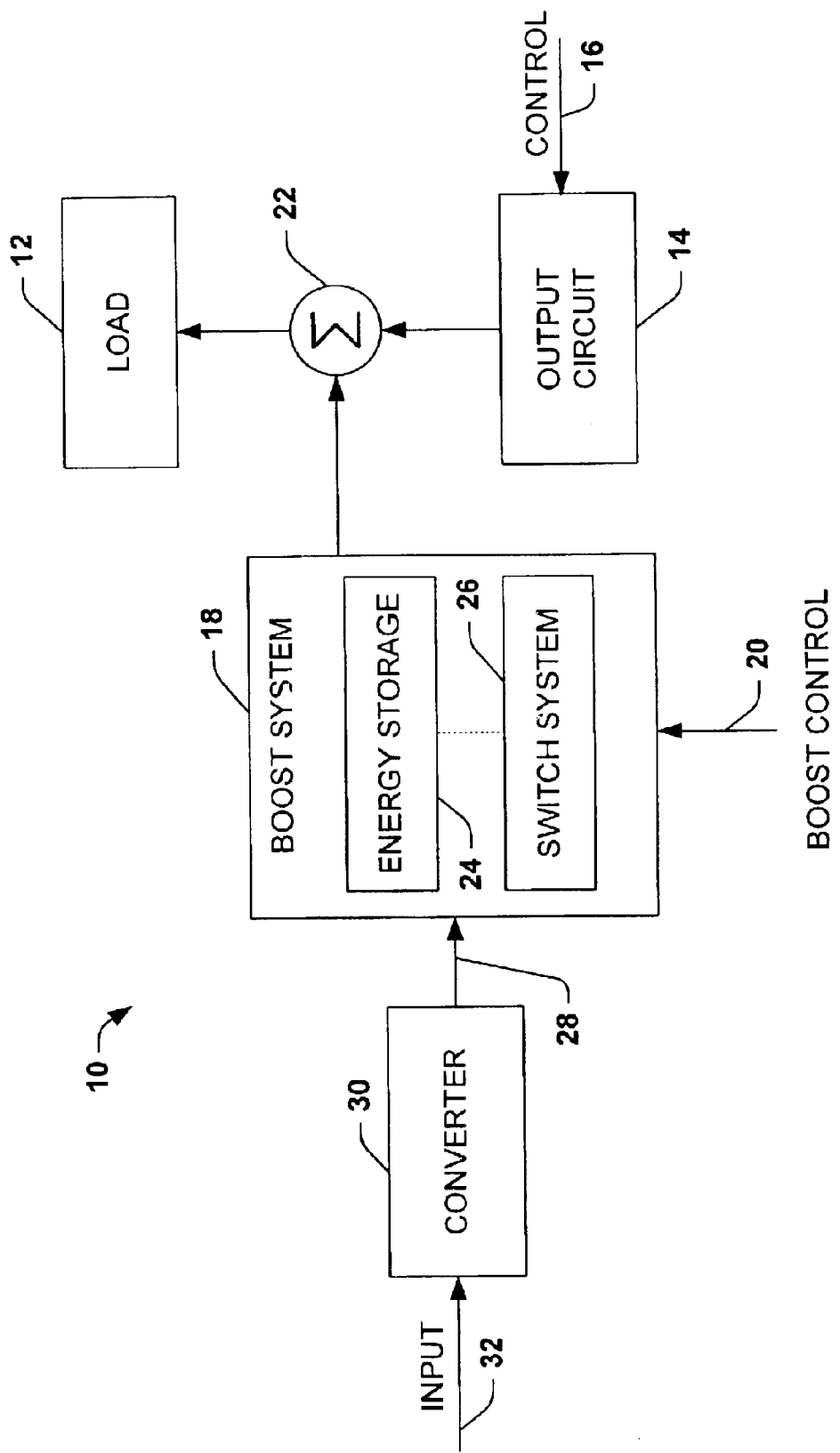
FIG. 1 is a block diagram of a boost system in accordance with an aspect of the present invention.

FIG. 1 illustrates an example of a driver system 10 implemented in accordance with an aspect of the present invention. The system 10 is programmed and/or configured to drive a load 12 with a bias to energize the load accordingly. For example, the load 12 can be an inductive load having a known inductance as well as other impedance characteristics. The system 10 includes an output circuit 14 that is coupled to drive the load based on one or more control signals 16. Those skilled in the art will understand and appreciate various ways in which control can be applied to the output circuit 14 to drive the load 12 in a desired manner. The output circuit 14, for example, can be configured as a bridge circuit coupled to the load and operative to bias the load with electrical current having a desired magnitude and direction, which current can vary based on digital data provided from an associated host system (not shown).

In accordance with an aspect of the present invention, the system 10 also includes a boost system 18 that is coupled to provide a boost when biasing the load. The boost system 18 provides a boost bias signal based on a change in the biasing of the load, such as in response to one or more boost control signals 20. The boost bias signal is applied to facilitate reversing the direction (or polarity) of the bias current provided by the output circuit 14.

In the schematic example illustrated in FIG. 1, each of the output circuit 14 and boost system 18 provides its respective bias to a summing block 22, which can correspond to one or more nodes of a circuit that are coupled to associated terminals of the load 12. The summing block 22 thus aggregates the bias signals from the output circuit 14 and the boost system 18 to provide an aggregate bias for driving the load 12 accordingly. Because, according to an aspect of the present invention, the boost bias is applied for an initial part biasing in response to reversing bias direction, the boost bias thus manifests as an overshoot (or undershoot) in the aggregate current through the load 12, thereby improving the rise or fall time of the load current.

The boost system 18 includes one or more energy storage components 24 and a switch system 26. For example, the energy storage component 24 and the switch system 26 can form a switched capacitor network coupled to provide a bias voltage for controlling boost current through the load. The switch system 26 is operatively coupled to the energy storage component 24 to selectively charge and discharge the storage component for providing a desired boost bias to the summing block 22. For example, the boost system 18 provides the boost bias as positive or negative current pulses having a duration sufficient to boost the bias provided by the output circuit 14, such that the rise or fall time of the load current is facilitated.

The boost system 18 can be programmable to provide a desired amount of boost bias based on an input 28. The input 28, for example, can define an associated boost voltage that is available for charging the energy storage component 24. In the illustrated example, the input signal 28 is provided by a converter 30 based on another input 32. The converter 30, for example, is a digital-to-analog (DAC) converter configured to convert a corresponding predefined digital input (e.g., one or more bits) 32 to a corresponding voltage level to set the boosting bias accordingly. In this way, the system 10 can implement a desired amount of boost when driving the load 12 to improve performance of the system.

By way of example, the input 32 can be provided from a register or other digital storage component. The input 32 can be set to a value that affords improved performance of the system 10, such as including desirable rise and fall times associated with transitions in the load current. Those skilled in the art will understand and appreciate various factors (e.g., internal and external to the system 10 and its operation) can influence selecting a proper amount of boost to achieve the desired operating characteristics. Those skilled in the art will further appreciate that by enabling the boost to be programmable, in accordance with an aspect of the present invention, the system 10 thus can be utilized in conjunction with various different types and configurations of driver circuits having the same or different load devices and provide improved performance by programming the boost system accordingly.

Figure 2:
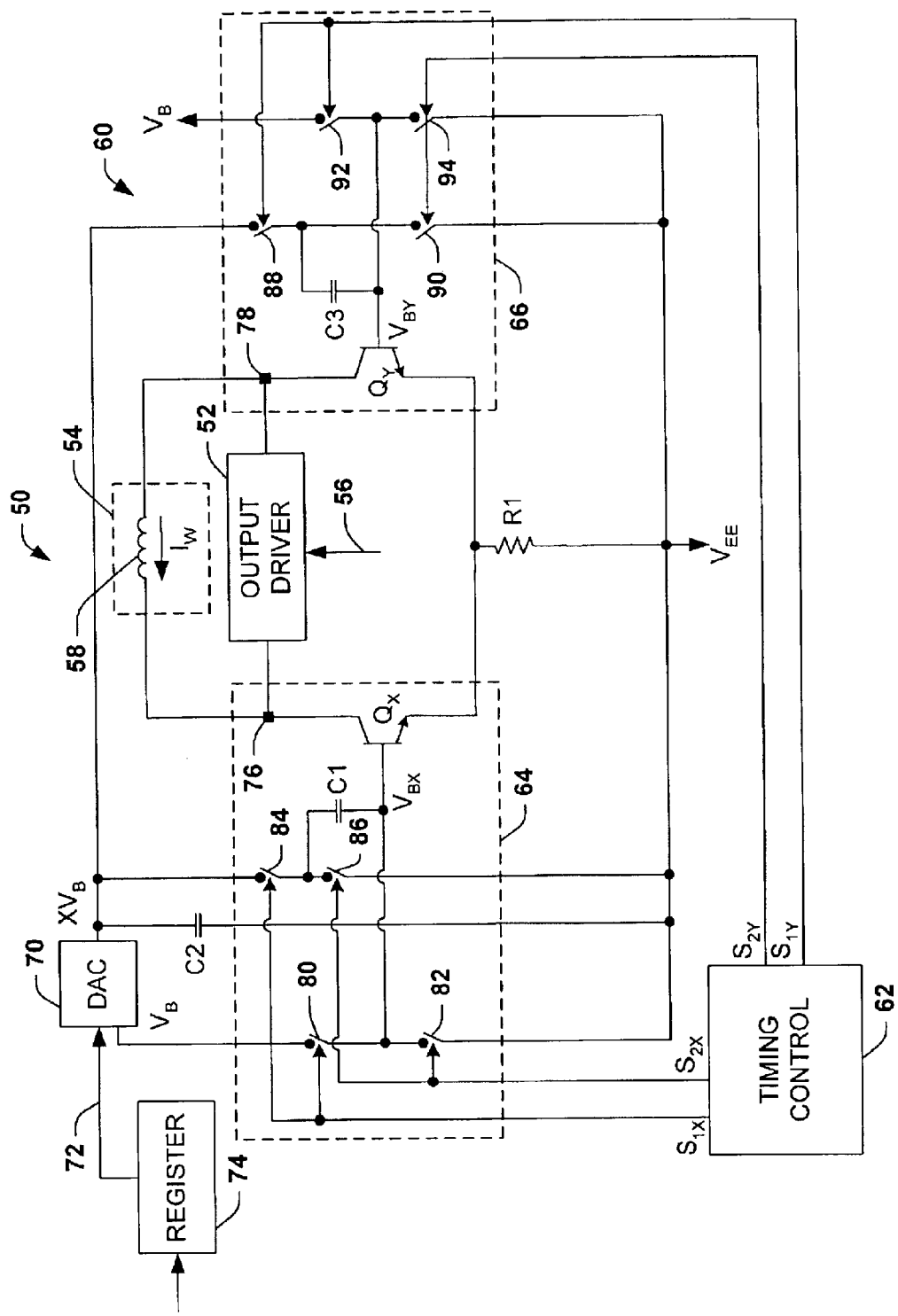
FIG. 2 is an example of a schematic diagram illustrating a driver system implementing a boost system in accordance with an aspect of the present invention.

FIG. 2 depicts an example of a write driver system 50 implemented in accordance with an aspect of the present invention. The driver system 50 includes an output driver, schematically indicated at 52, coupled to drive an associated load device 54. The output driver 52, for example, includes an upper set and a lower set of switching transistors, such as arranged in an H-bridge configuration relative to the load device 54. A control system (not shown) can be coupled to provide input signals 56 to the switching components of the output driver 52 so as to selectively drive current through the load 54. The input signals 56 thus control the switching transistors to apply write current $I_W$, such as representing write data, relative to the load device 54. The control system, for example, can provide the input signals 56 to the H-bridge as a differential signal (e.g., via two more connections) at standard ECL or other logic signal levels. Those skilled in the art will understand and appreciate various types and designs of output drivers and controls that can be utilized to selectively provide write current $I_W$ to the load device 54.

The load device 54 can be a write head of a disk drive system that includes an inductor 58 having a corresponding inductance. The inductor 58, for example, can be implemented as an external thin film transducer connected to the outputs of the output driver 52 through a flex or other suitable connection.

A boost system 60 is operative to provide a boost current relative to the load device 54 in accordance with an aspect of the present invention. The boost current is aggregated with current provided by the output driver 52 to facilitate reversing the direction of the write current $I_W$. In the example illustrated in FIG. 2, the boost system 60 is implemented as a switched capacitor network coupled across the load device 54 via a pair of transistors $Q_X$ and $Q_Y$. For example, $Q_X$ and $Q_Y$ are bipolar transistors having their collectors coupled to opposed end nodes (or terminals) of the load device 54 with their emitters coupled to a low voltage $V_{EE}$ through a resistor R1. A timing control system 62 controls operation of the boost system 60 so as to apply desired bias control voltages $V_{BX}$ and $V_{BY}$ at the bases of $Q_X$ and $Q_Y$, respectively. This, in turn, provides desired boost current that is aggregated with the current provided by the output driver 54.

The timing control 62 is programmed and/or configured to control parts 64 and 66 of the boost system 60, such that an appropriate boost current is provided in response to a change (e.g., a reversal) in the write current $I_W$. For example, the timing control 62 selectively controls the respective parts 64 and 66 of the boost system 60 for a duration concurrently with an initial part of a write cycle to provide a desired amount of overshoot (or undershoot) in the write current $I_W$ and thereby facilitate a polarity change in the write current. The duration for activating the boost system 60 can be user-programmable, such as by setting an associated register (not shown) via a user interface (e.g., a serial interface) that receives corresponding input data operative to control the timing control 62. The timing control 62 thus controls the direction and duration in which the boost current is provided relative to the load device 54, which direction generally depends on the direction in which the output driver 52 drives current relative to the load device.

The amount (or level) of boost provided by the boosting system 60 depends on the voltages provided by a digital-to-analog converter (DAC) 70. The DAC 70 provides a boost voltage $V_B$ and another, higher boost voltage $XV_B$ (collectively defining a boost potential), where X denotes the proportional relationship between boost voltages provided by the DAC 70. The boost voltages $V_B$ and $XV_B$ vary as a function of an input 72, such as provided by a boost setting register 74. A user (e.g., manufacturer) of the driver system 50 or a of a disk drive system implementing the driver system can program the boost setting register 74 via an input interface (e.g., a serial or other user interface) to provide a desired digital input to program the DAC. The DAC 70, in turn, provides corresponding boost voltages $V_B$ and $XV_B$ based on the input 72 to the parts 64 and 66 of the boost system 60 in accordance with an aspect of the present invention. The number of possible of boost voltages depends, at least in part, based on the number of bits in the digital input 72.

For example, the boost voltage $XV_B$ can range between about 0V and a maximum positive voltage (e.g., about 5V), although other ranges also could be utilized. The voltage $XV_B$ provides a fixed voltage that is greater than $V_B$, which further is greater than $V_{EE}$. By way of further example, $V_B$ can be provided to be about halfway between $XV_B$ and $V_{EE}$. Because a DAC 70 is utilized to provide the programmable fixed boost voltage (as compared to a conventional voltage supply), those skilled in the art will understand and appreciate that additional accuracies can be achieved in generating boost current based on such boost voltages.

An appropriate boost voltage may depend on a combination of several factors associated with the configuration and operation of the system 50. By way of example, for a disk drive system, these factors can include the inductance of the inductor 58, the flux associated with the inductor, the rate at which flux changes in the load device 54, the flying height of the head relative to the surface of a disk, the temperature of the head, and the like. Thus, the boost voltage (and the resulting boost current) can be set for a given implementation based on a quantitative analysis of these factors or by empirical testing (e.g., trial and error).

In the example of FIG. 2, the different parts 64 and 66 of the boost system 60 are coupled to provide a desired boost current relative to different output nodes 76 and 78 coupled to the load device 54. It will be understood and appreciated, however, that the boost system 60 could alternatively be configured, according to an aspect of the present invention, to provide both positive and negative boost current relative a given single node coupled to the load device 54.

By way of example, the first part 64 of the biasing system 60 is coupled to control operation of $Q_X$. The DAC 70 provides the boost voltage $V_B$ to a switch 80 that is coupled between the DAC and the base of $Q_X$. Another switch 82 is coupled between the base of $Q_X$ and $V_{EE}$. The DAC 70 provides $XV_B$ to a switch 84 that is coupled between the DAC and another switch 86. The switch 86 is coupled between the switch 84 and $V_{EE}$. A boost capacitor C1 is coupled between the node interconnecting switches 84 and 86 and the base of $Q_X$. Another capacitor C2 is coupled between $XV_B$ and $V_{EE}$ to help stabilize the voltage potential there between.

As depicted in FIG. 2, the timing control 62 concurrently controls operation of switches 80 and 84 via timing signal $S_{1X}$ and concurrently controlled switches 82 and 86 with signal $S_{2X}$. For example, the timing control 62 provides $S_{1X}$ to activate the switches 80 and 84 to provide boosting via operation of $Q_X$, such as in response to changing the direction of the write current $I_W$ (e.g., from positive to negative current). When $S_{1X}$ activates the switches 80 and 84, the timing control provides $S_{2X}$ to deactivate the switches 82 and 86. The switches 82 and 86 are normally closed via $S_{2X}$ to couple both sides of C1 to $V_{EE}$, except during boosting by this part 64 of the boost system 60. Thus, when signal $S_{1X}$ activates switches 80 and 84, the signal $S_{2X}$ deactivates switches 82 and 86, such that the capacitor C1 rapidly charges node $V_{BX}$ to approximately $XV_B$, which then settles to $V_B$. The amount of time that the switches 80 and 84 are on defines the duration of the boost provided to the load 54. As mentioned above, this duration can be programmable at the timing control 62 and the boost voltages $XV_B$ and $V_B$ are programmable via input 72 to the DAC 70.

It will be appreciated that it may be more effective to set the boost voltage $V_B$ to operate $Q_X$ in its active region for some or all of the boost duration that $S_{1X}$ is high; although $Q_X$ typically will experience at least some saturation due to C1 raising node $V_{BX}$ to a higher $XV_B$ voltage. Those skilled in the art will further appreciate that selecting a boost voltage that causes $Q_X$ to operate in saturation still should provide improved performance relative to conventional systems, with the saturation providing non-linear control of the boost current.

After implementing the boost for the defined duration, the timing control 62 provides $S_{1X}$ to turn off switches 80 and 84 and provides signal $S_{2X}$ to turn on switches 82 and 86. This causes the voltage across C1 to discharge through the switch 82 to $V_{EE}$, thereby causing the voltage $V_{BX}$ at the base of $Q_X$ to initially go negative and then settle to $V_{EE}$ during this switch state. As a result, the boost current provided by $Q_X$ is quickly terminated until the next boost mode requiring this type (e.g., polarity) of current boost for the load. This makes the boot pulse fall time much faster allowing higher speed operation and better control of boost current width. The other part 66 of the boost system 60 operates in a similar manner to effect the desired boosting of the current applied to the load device 54, such as in response to changing the direction of the write current $I_W$ (e.g., from negative to positive current). In particular, the DAC 70 provides the $XV_B$ output to a switch 88 that is coupled to the base of $Q_Y$ through a capacitor C3. Another switch 90 is coupled to the juncture of the switch 88 and capacitor C3 and to $V_{EE}$. The DAC 70 also provides the $V_B$ output to switch 92, such as coupled between the DAC and the base of $Q_Y$. Another switch 94 is coupled between the base of $Q_Y$ and $V_{EE}$.

In order to provide a desired boost current to the load device 54, the timing control 62 provides control signals $S_{1Y}$ and $S_{2Y}$ to selectively control the switches 88–94. Specifically, the timing control 62 provides $S_{1Y}$ to concurrently activate switches 88 and 92 to their on conditions to provide desired boosting via a bias voltage $V_{BY}$ at the base of $Q_Y$. When the switches 88 and 92 are on, the timing control 62 provides $S_{2Y}$ to deactivate normally closed switches 90 and 94. For example, when the switches 88 and 92 are turned on, the switches 90 and 94 are turned off. This causes the capacitor C3 to rapidly charge, such that $V_{BY}$ ramps to $XV_B$ and then rapidly settles to $V_B$ during the boosting period. This activates $Q_Y$, which can include operation in both its active region as well as saturation, to provide a corresponding boost current to the load device 54. The boost current is aggregated with the current from output driver 52 to provide desired overshoot in the aggregate write current $I_W$ to facilitate reversing the direction of the write current according to an aspect of the present invention.

The duration that the timing control 62 activates switches 88 and 92 in their on conditions, which duration can be programmable, defines the duration of the boost. The amplitude of the boost, as mentioned above, is determined by the programmable input 72 to the DAC 70. Then, after a desired boost duration has been provided, the timing control 62 turns off switches 88 and 92 via $S_{1Y}$ and provides $S_{2Y}$ to activate switches 90 and 94 to their on conditions such that the capacitor C3 can discharge to $V_{EE}$ and $V_{EE}$ is applied at the base of $Q_Y$.

It thus is to be appreciated that a circuit implemented in accordance with an aspect of the present invention provides a flexible approach to implementing a boost control circuit that can be adapted to facilitate reversal of write current for various circuit configurations. It further is to be appreciated that the switches 70–84 have been generically described as switches because any solid state or digital device capable of switch-like behavior can be utilized. For example, each of the switches can be implemented as one or more transistors (e.g., FETs, bipolar transistors, or combinations thereof), although any other suitable devices (e.g., thyristors, digital registers or flip flops, and the like) can be used in accordance with an aspect of the present invention.

Figure 3:
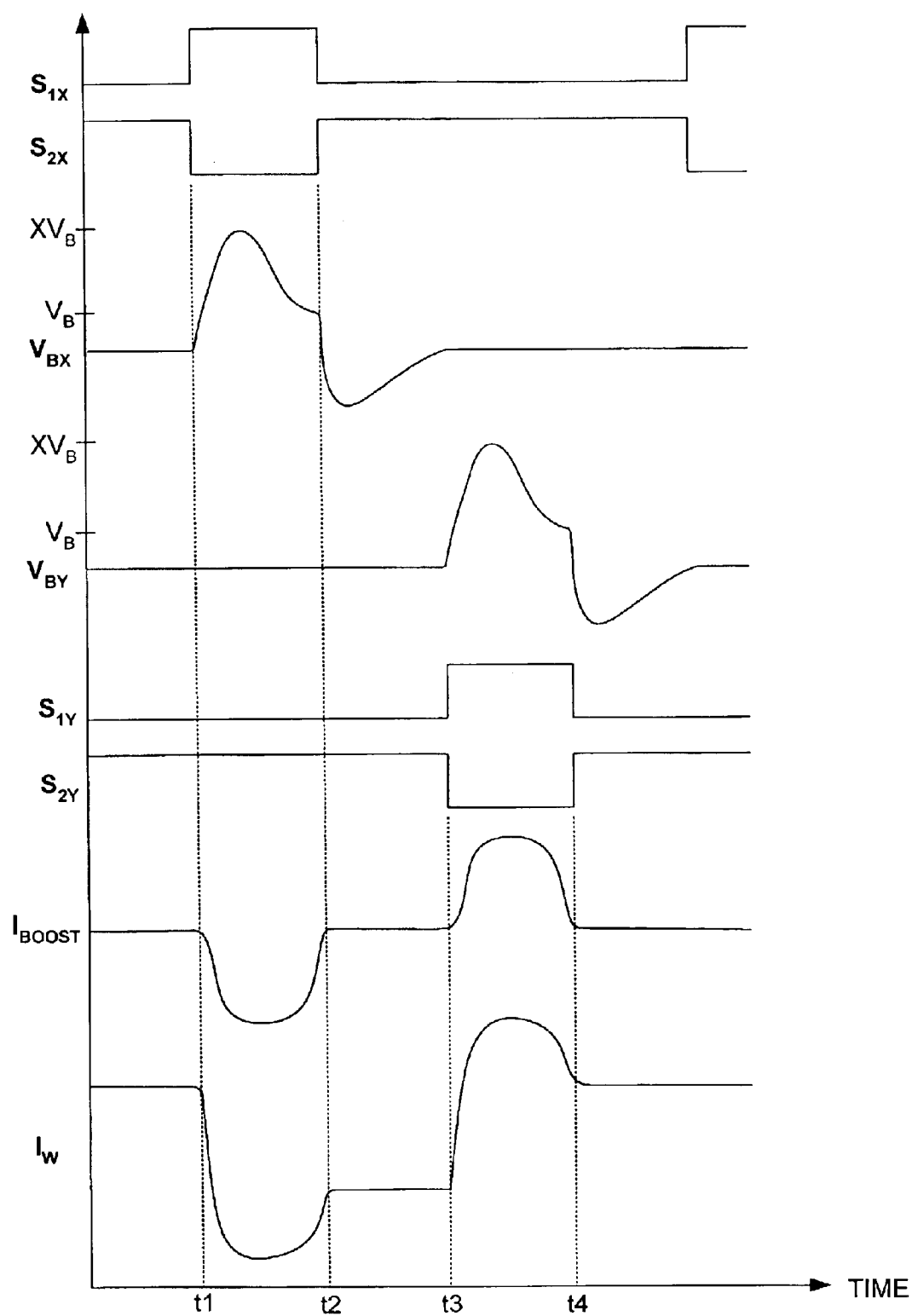
FIG. 3 depicts examples of signals associated with implementing boosting in accordance with an aspect of the present invention.

The operation of a boost system implemented in accordance with an aspect of the present invention will be better appreciated with reference to FIG. 3. FIG. 3 illustrates an example of various signals plotted as a function of time associated with operation of a boost system in accordance with an aspect of the present invention. For purposes of simplicity of explanation and brevity, the signals shown in FIG. 3 correspond to timing and other signals utilized in connection with the driver system 50 of FIG. 2. Accordingly, FIG. 3 will be described with reference to the example circuit diagram illustrated in FIG. 2.

Turning to FIG. 3, positive write current $I_W$ initially flows through an associated load. At time t1, such as corresponding to reversing the write current (e.g., a positive to negative transition), $S_{1X}$ goes high and $S_{2X}$ goes low. $S_{1Y}$ is low and $S_{2Y}$ is high. This results in the voltage $V_{BX}$ charging rapidly (e.g., through capacitor C1) to or near $XV_B$ and then eventually settling to about $V_B$. At t2, $S_{1X}$ goes low and $S_{2X}$ goes high. This causes $V_{BX}$ to decrease rapidly to deactivate $Q_X$ and thus turn off the boost current IBOOST For example, in response to $S_{2X}$ going high to turn on switches 72 and 76, $V_{BX}$ decreases by discharging capacitor C1 through the switches and eventually stabilizes to $V_{EE}$ so that $Q_X$ deactivates rapidly and remains off during the time that $S_{2X}$ is high. The write current $I_W$ thus settles to its DC current, such as provided by the associated bridge circuit.

The length of time that the signal $S_{1X}$ is high (e.g., t2−t1) defines the boost duration for which boost current IBOOST is applied through the load. The boost current IBOOST is aggregated with switched DC current from an associated bridge circuit, for example, to provide the write current $I_W$. As depicted in FIG. 3, between times t1 and t2, the write current $I_W$ includes overshoot corresponding to the boost current provided. As described herein, one or both of the duration and magnitude of boost current IBOOST can be programmable in accordance with an aspect of the present invention (e.g., by controlling the duration that $S_{1X}$ is high (t2−t1) and by controlling the available boost voltage $V_B$ and $XV_B$.

Then at t3, which for example corresponds to a negative to positive transition in the write current $I_W$, $S_{1Y}$ goes high and $S_{2Y}$ goes low. $S_{1X}$ remains low and $S_{2X}$ remains high. With $S_{1Y}$ going high, switches are activated to rapidly increase the voltage $V_{BY}$ and, in turn, to bias $Q_Y$ based on the programmed boost voltage provided by the DAC 70. As depicted in FIG. 3, for example, $V_{BY}$ increases to approximately $XV_B$ and then settles to about $V_B$. This results in a positive boost current $I_{BOOST}$ being aggregated with the current from the associated bridge circuit to boost the write current $I_W$ in accordance with an aspect of the present invention. At time t4, $S_{1Y}$ goes low and $S_{2Y}$ goes high, such that the write current $I_W$ settles to its DC current level, as provided by the associated bridge circuit. The duration t4−t3 defines the boost duration for applying the boost current to the load. One or both of the boost duration and the boost voltage can be programmable to facilitate utilizing a boost control system according to an aspect of the present invention. It is to be appreciated that the boost duration for positive and negative boost currents can be the same or different.

Figure 4:
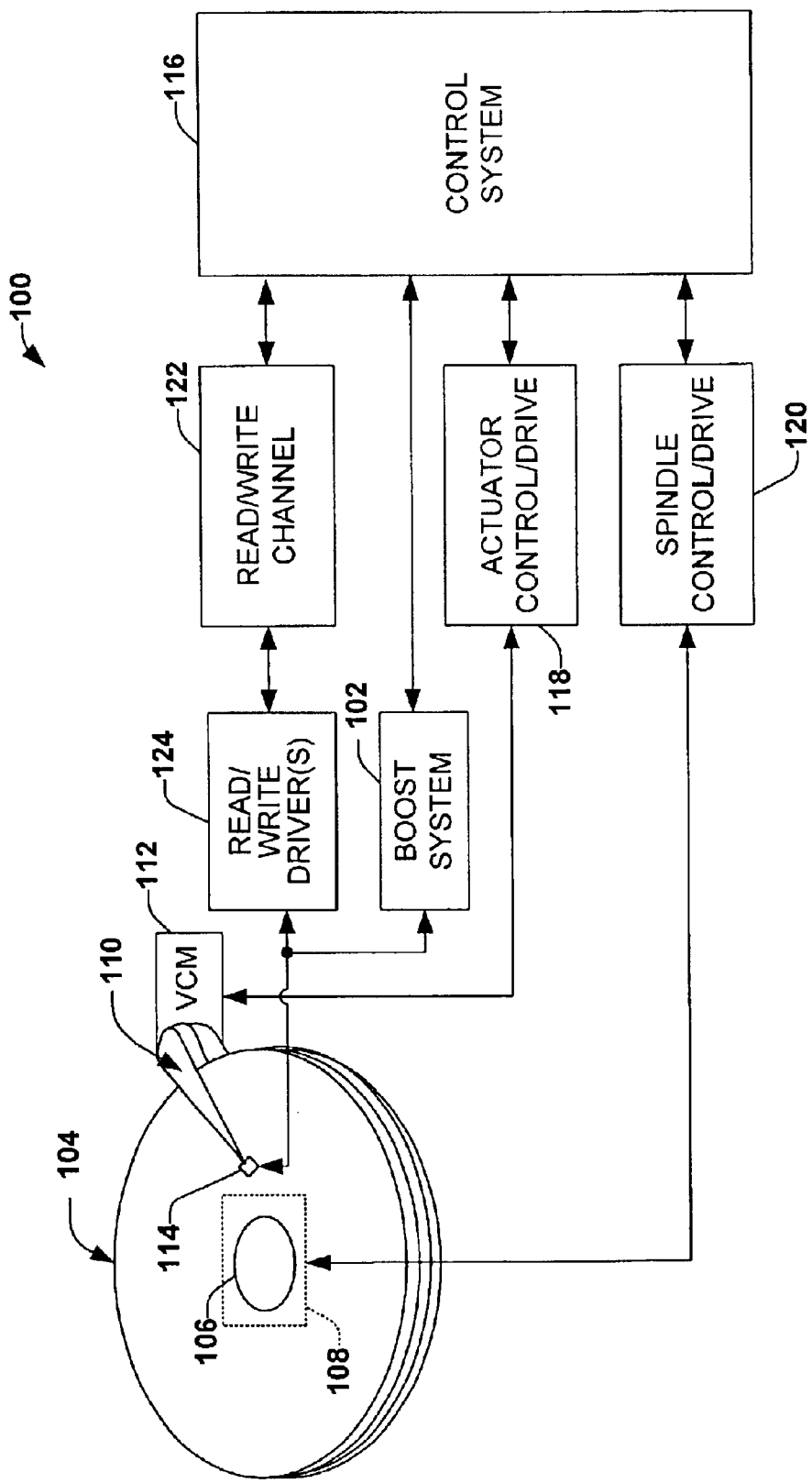
FIG. 4 is an example of a disk drive system implementing a boost system in accordance with an aspect of the present invention.

FIG. 4 is an example of a disk drive system 100 implementing a boost system 102 in accordance with an aspect of the present invention. The disk drive system 100 includes a plurality of stacked magnetic recording disks 104 mounted to a spindle 106. The disks 104, for example, are conventional particulate or thin film recording disks or, alternatively, they could be liquid-bearing disks or other types of recordable media. The spindle 106 is attached to a spindle motor, schematically indicated in phantom at 108, which rotates the spindle 106 and disks 104.

A plurality of actuator arms 110, sometimes referred to as a "comb," is arranged for movement along the surface of the respective disks 104. In order to effect movement of the arms 110, the system 100 includes a rotary voice coil motor (VCM) 112 operatively attached to the actuator arms.

A plurality of inductive transducer heads 114 are attached to suspension assemblies of the respective actuator arms. Each head 114 includes one or more inductive write elements (not shown). Each head 114 may also include an inductive read element or a MR read element (also not shown). The heads 114 are positioned proximate to the disks 104 by the suspension assemblies so that, during operation, the heads are in electromagnetic communication with the disks. The VCM 112 rotates the actuator arms 110 to move the heads 114 to the desired radial position relative to the disks 104.

A control system 116 provides overall control to disk drive system 100. For example, part of the control system 116 is programmed and/or configured to control the motors 108 and 112 in the disk drive system 100, such as for controlling rotation of the disks 104 and positioning of the heads 114. The control system 116, for example, includes a central processing unit (CPU), memory and other digital circuitry (not shown). It will be understood and appreciated that the motor control functionality provided by the control system can be implemented as hardware, software or a combination of hardware and software. The control system 116 is connected to an actuator control/drive unit 118 that controls operation of the VCM 112 based on information from the control system 116. The control system 116 is also connected to a spindle control/drive unit 120 to control the spindle motor 108 based on control information from the motor control system.

A host system (not shown), such as a computer system or personal computer (PC), can be connected to the control system 116 for implementing desired read and write operations relative to the disks 104. By way of example, the host system can send digital data to the control system 116 to be stored on the disks 104, or it may request that digital data at a specified location be read from the disks and sent back to the host system.

Another part of the control system 116 thus controls reading or writing of data relative to the disks 104. For example, a read/write channel 122 is coupled to receive read and write signals generated by the control system 116. The read/write channel 122 can implement signal conditioning and communicate the read/write signals to appropriate electronics associated with the respective heads 114. In the illustrated example of FIG. 4, the electronics include one or more write driver(s) 124. By way of further example, such electronics 124 can include an integrated circuit (IC) chip including read drivers, write drivers, and associated control circuitry as well as a boost system 102 in accordance with an aspect of the present invention. The drivers 124 and associated circuitry can be implemented as a printed circuit board, or a flexible carrier, mounted on the actuator arms 110 or in close proximity thereto. The driver 124 and other associated electronics are coupled via connections in the printed circuit board to the read/write channel 124 and also to each head 114.

The boost system 102 is associated with the driver circuitry 124 to facilitate a reversal in the write current according to one or more aspects of the present invention. The boost system 102, for example, includes a network of energy storage devices (e.g., capacitors) and switches coupled to the inductive heads 114 in parallel with a bridge circuit of the write driver 124. A DAC receives a digital input, which can be programmable, that sets a boost voltage for controlling boost current to be applied to the load. By way of example, the control system 116 or a separate control in the boost system 102 implements desired timing of the switch network to selectively charge and discharge the energy storage devices to supply the boost control voltage. The boost control voltage is supplied for a duration, which may be user-programmable, such as in response to initiating a reversal in the write current polarity that is applied to the head 114. The boost system 102 thus controls the magnitude and duration of the boost current for an initial part of the next write cycle to facilitate reversing the direction of current through the inductive head 114 according to one or more aspects of the present invention. As a result of improving the rise and fall times of the write current, an efficient write speed can be achieved for the disk drive system 100.

Figure 5:
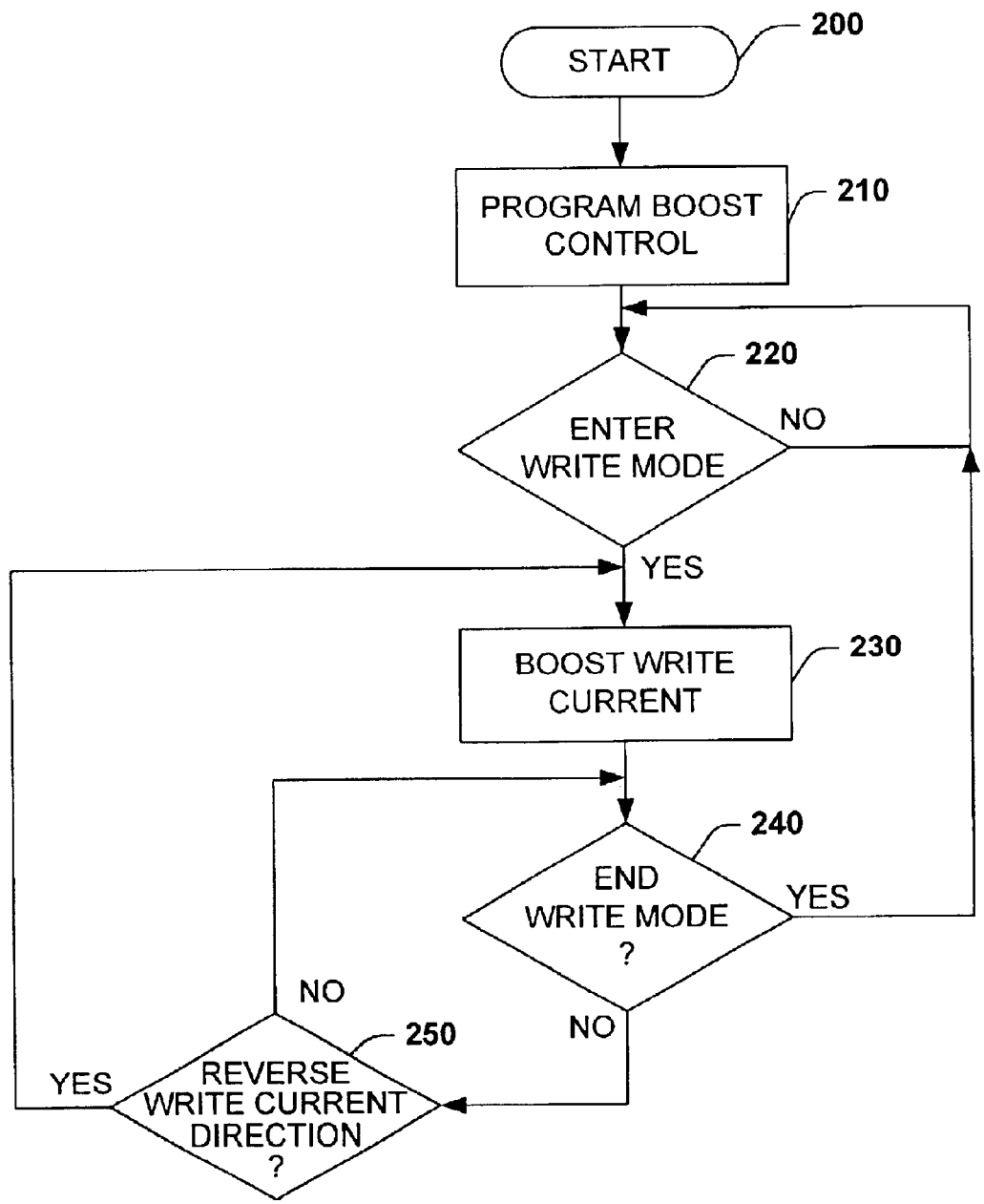
FIG. 5 is a flow diagram illustrating a methodology for boosting current to facilitate reversal of current in accordance with an aspect of the present invention.
Figure 6:
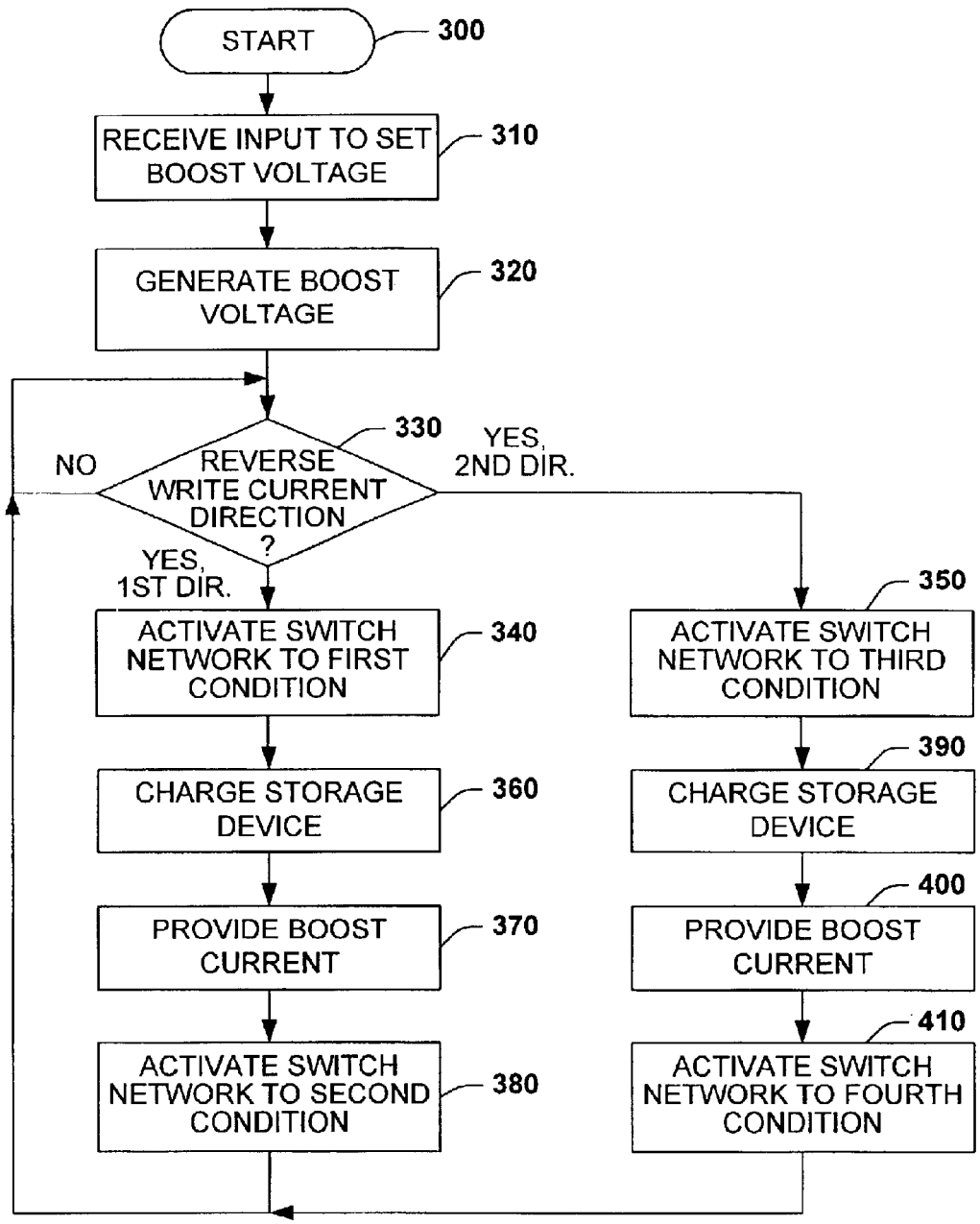
FIG. 6 is a flow diagram illustrating a methodology for implementing boosting in accordance with an aspect of the present invention.

In view of the foregoing structural and functional features described above, a methodology for mitigating overshoot associated with a drive current, in accordance with an aspect of the present invention, will be better appreciated with reference to FIGS. 5 and 6. While, for purposes of simplicity of explanation, the methodologies of FIGS. 5 and 6 are shown and described as being implemented serially, it is to be understood and appreciated that the present invention is not limited to the illustrated order, as some aspects could, in accordance with the present invention, occur in different orders and/or concurrently with other aspects from that shown and described. Moreover, not all illustrated features may be required to implement a methodology in accordance with an aspect of the present invention. It is to be further understood that the following methodologies can be implemented in hardware (e.g., as one or more integrated circuits), software, or any combination thereof.

Turning to FIG. 5, the methodology begins at 200, such as in connection with supplying power to a system (e.g., a disk drive system) implemented in accordance with an aspect of the present invention. This can include initializing variables to their starting values, setting flag conditions and ramping voltage and current supplies to their appropriate levels. At 210, the boost control system is programmed. Such programming, which is typically performed by the manufacturer of the disk drive system, can include programming a desired boost voltage, programming a duration for applying the boost, or both. For example, the desired boost voltage can be set by programming one or more registers or other storage devices capable of storing information indicative of a desired boost voltage. A DAC can receive the stored boost voltage information (e.g., a digital word) and convert the voltage information into corresponding boost voltages $V_B$ and $XV_B$. Timing controls also can be set to control the duration of boosting to be applied when the write current changes direction.

At 220, a determination is made as to whether the system has entered the write mode, such as in response to a request from an associated host system to write data relative to one or more associated disks. If the determination is negative the boost system can remain inactive and loop at 220. If the determination is positive, indicating that data is to be written, the methodology proceeds to 230. At 230, the write current is boosted for a duration and according to the boost voltage, such as based on the programming at 210. After implementing such boosting, the methodology proceeds to 240 to determine whether the write mode has ended. If the write mode ends, the methodology can return to 220 to wait until reentering the write mode for further boosting. If the write mode has not ended, the methodology can proceed from 240 to 250.

At 250, a determination is made as to whether the write current direction is to reverse. As mentioned above, the write current reverses in response to the data (e.g., 1's and 0's) being written. If there is no reversal in the write current, the methodology can loop between 240 and 250 until either the write mode ends or write current reverses direction. In response to reversing direction of the write current, the methodology returns to 230 so as to boost the write current to facilitate reversing the direction of the write current according to an aspect of the present invention. It will be appreciated that boosting provided at 230 can be positive or negative boost current through the load, depending on which direction the write current is transitioning. It further will be appreciated that the reversing of write current need not be detected to implement such boosting; but instead, the boosting can be controlled to implement concurrently with reversing the write current.

FIG. 6 depicts a methodology depicting an example of how boosting of write current can be implemented in accordance with an aspect of the present invention. The methodology begins at 300, such as in connection with programming boost parameters. The boost parameters, for example, can include one or more of a boost voltage and boost duration. The programmable boost parameter can be set to select one or two or more possible boost voltages (e.g., $V_B$ and $XV_B$) within a predetermined voltage range, such as ranging from 0V to about 5V. After the boost control parameters are programmed, the methodology proceeds to 310.

At 310, an input indicative of the programmed boost voltage parameter is received, such as by a DAC. At 320, a corresponding boost voltage is generated according to the value (e.g., a binary value) indicated by the input. For example, the DAC generates boost voltage at 320 by converting the digital input received at 310 to a corresponding analog substantially fixed boost voltage. The boost voltage can thus be provided to an associated switch network that is operative to employ the boost voltage to provide desired boost current to the load in accordance with an aspect of the present invention.

At 330, a determination is made (e.g., controlled by timing signals) as to whether there is to be a reverse in the direction of the current through the load, such as may require boosting. If the determination is negative, the boosting methodology can remain at 330. If the timing signals are provided to implement boosting, the methodology can proceeds to either 340 or 350 depending on the direction to which the current is reversing. For example, if current is reversing to a first direction through the load, the methodology proceeds to 340, whereas if current is reversing from the first to a second direction, the methodology proceeds to 350.

Assuming, for example, that the write current is reversing from the second to the first direction, at 340, the switch network is activated to a first condition to implement corresponding boosting. For example, this can include coupling the boost voltage to an energy storage device, such as a capacitor, to rapidly charge the storage device at 360. At 370, the boost current is provided based on the voltage associated with the storage device. An associated component (e.g., a transistor), for example, can be biased by the voltage associated with the storage device to provide the boost current to the load. The boost current is provided for a duration, which can be programmable, while the switch network is in the first condition. After the duration has expired, the methodology proceeds to 380, in which the switch network is activated to a second condition to remove the boosting associated with operation of the switch network in the first condition.

From 380, the methodology returns to 330 to repeat the foregoing steps to implement the next current boost, which boosting can be controlled based on timing signals. It is to be understood and appreciated that the next current boost provided by operating the switch network typically will boost the current in the opposite direction through the load commensurate with the change in the DC write current. The different polarity of boost current can be provided by controlling different parts of the switch network, which can be coupled to different ends of the load or, alternatively, by controlling the direction in which boost current is supplied to the load.

If the determination at 330 is positive and indicates that current is to reverse through the load to the second direction, the methodology proceeds to 350 in which the switch network is activated to a third condition to implement corresponding boosting. For example, this can include coupling the boost voltage to an energy storage device (e.g., a capacitor) to rapidly charge the storage device at 390. At 400, the boost current is provided based on the voltage associated with the storage device. The associated voltage, for example, biases another current transistor to provide the boost current to the load based on the programmed boost voltage. The boost current is provided for a duration, which also can be programmable, while the switch network is in the third condition. After the duration has expired, the methodology proceeds to 410, in which the switch network is activated to a fourth condition to remove the boosting provided at 400. From 400, the methodology returns to 330 where it can continue while in the write mode. It thus will be appreciated that the methodology facilitates reversing write current through the load (e.g., inductive write head) based on data being written to a magnetic storage medium in accordance with an aspect of the present invention.

What has been described above includes examples and implementations of the present invention. Because it is not possible to describe every conceivable combination of components, circuitry or methodologies for purposes of describing the present invention, one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A boosting system to facilitate reversal of current through an associated load, comprising:

a programmable voltage generator operative to generate a boost voltage based on a programmable input; and a switch network coupled to the boost voltage and operative to control a boost current supplied relative to the associated load in response to a control signal indicating a reversal of the current through the associated load.

2. The system of claim 1, the programmable voltage generator further comprising a digital-to-analog converter (DAC) operative to convert a digital input corresponding to the programmable input into the boost voltage based on the digital input.

3. The system of claim 2, further comprising a register operative to store an indication of the programmable input as the digital input, the register being coupled to provide the digital input to the DAC.

4. The system of claim 1, further comprising at least one energy storage device coupled to the switch network, the switch network being operative to couple the energy storage device to the boost voltage for biasing the boost current in response to a first control signal applied for a boost duration associated with reversing the current through the associated load.

5. The system of claim 4, the switch network being further operative to uncouple the energy storage device from the boost voltage and discharge the energy storage device for unbiasing the boost current in response to a second control signal applied after the boost duration.

6. The system of claim 5, the programmable supply providing a pair of proportional boost voltages, the switch network comprising first and second pairs of switch devices, the first pair of switch devices being operative to couple the energy storage device across the pair of boost voltages for the boost duration in response to the first control signal, the second pair of switch devices being operative to couple the energy storage device across a voltage that is lower than each of the pair of boost voltages in response to the second control signal, such that the boost current is activated for approximately the boost duration.

7. The system of claim 6, the switch network further comprising a current transistor coupled to receive a bias voltage associated with the energy storage device and to provide the boost current relative to the load based on the bias voltage according to operation of the first and second pairs of switch devices.

8. The system of claim 1, the switch network defining a first part of the switch network operative to control a first supplemental boost current supplied in a first direction relative to the associated load in response to the control signal indicating a reversal of the current through the associated load from a second direction to the first direction, the switch network further comprising a second part of the switch network coupled to the boost voltage and operative to control a second supplemental boost current supplied in the second direction relative to the associated load in response to the control signal indicating a reversal of the current through the associated load from the first direction to the second direction.

9. The system of claim 8, further comprising a pair of energy storage devices, each being coupled to a respective one of the first and second parts of the switch network, each of the first and second parts of the switch network being operative to couple the respective energy storage device to the boost voltage depending on the direction current is reversing based on the control signal, thereby biasing the first and second supplemental boost currents, respectively.

10. A write driver combination with the system of claim 1, the write driver coupled to selectively provide a write current to the associated load comprising an inductive write head, the boost current being aggregated with the write current to provide an aggregate write current so as to facilitate reversing direction of the write current through the inductive write head.

11. The combination of claim 10, further comprising a timing control operative to control the switch network to provide the boost current to the load based on the write current being provided by the write driver.

12. A system to facilitate operation of an inductive write head, comprising:
an output driver circuit coupled to drive write current in a direction through the inductive write head based on data to be written to a magnetic recording medium; and
a boost system coupled to provide boost current to the inductive write head based on reversing the direction of the write current through the inductive write head, the boost system providing the boost current as a function of a predetermined programmable substantially fixed boost voltage.

13. The system of claim 12, the further comprising a digital-to-analog converter (DAC) operative to convert a digital input into the boost voltage based on the digital input.

14. The system of claim 13, further comprising a register operative to store the digital input based on a user input, the register being coupled to provide the digital input to the DAC for setting the boost voltage.

15. The system of claim 13, the boost system further comprising a switch network operative to selectively couple the boost voltage to at least one energy storage device in response to a first control signal applied for a boost duration associated with reversing the direction of the write current through the inductive write head, the energy storage device controlling the boost current based on the boost voltage and the boost duration that the switch network couples the energy storage device to the boost voltage.

16. The system of claim 15, the switch network further being operative to uncouple the energy storage device from the boost voltage and discharge the energy storage device in response to a second control signal applied after the boost duration.

17. The system of claim 16, the DAC converting the digital input into a pair of proportional boost voltages, the boost system further comprising first and second pairs of switch devices, the first pair of switch devices being operative to electrically couple the energy storage device across the pair of boost voltages for the boost duration in response to the first control signal, each switch device of the second pair of switch devices being operative to couple the energy storage device across a voltage that is lower than each of the pair of boost voltages in response to the second control signal applied after the boost duration, such that the boost system provides the boost current for approximately the boost duration.

18. The system of claim 17, the switch network further comprising a current transistor coupled to receive a bias voltage associated with the energy storage device according to operation of the first and second pairs of switch devices and to provide the boost current relative to the inductive write head based on the bias voltage.

19. The system of claim 12, the direction of the boost current varying as a function of the direction of the write current through the inductive write head.

20. The system of claim 12, the boost system further comprising:
a first switch network operative to control a first supplemental boost current supplied in a first direction relative to the inductive write head in response to a timing control signal indicating a reversal of the write current from a second direction to the first direction through the inductive write head; and
a second switch network coupled to the boost voltage and operative to control a second supplemental boost current supplied in the second direction relative to the inductive write head in response to the control signal indicating a reversal of the write current from the first direction to the second direction through the inductive write head.

21. The system of claim 20, further comprising a pair of energy storage devices, each being coupled to a respective one of the first and second switch networks and to the boost voltage, each of the first and second switch networks operating mutually exclusively to couple a respective one of the pair of energy storage devices to the boost voltage for biasing the boost current in a direction relative to the inductive write head depending on the direction that the write current is reversing through the inductive write head.

22. A system to facilitate reversal of write current through an associated inductive load, comprising:
means for programming a substantially fixed boost voltage;
means for providing a first boost current as a function of the boost voltage and in a first direction relative to the inductive load in response to the write current reversing from a second direction to the first direction through the inductive load; and
means for providing a second boost current as a function of the boost voltage and in the second direction relative to the inductive load in response to the write current reversing from the first direction to the second direction through the inductive load.

23. A method to facilitate reversing a direction of write current through a write head, comprising:
in response to reversing direction of the write current through the write head from a first direction to a second direction, boosting the write current in the second direction for a first boost duration based on a programmable, substantially fixed boost voltage;
after the first boost duration, terminating the boosting of the write current;
in response to reversing direction of the write current through the write head from the second direction to the first direction, boosting the write current in the first direction for a second boost duration based on the boost voltage; and
after the second boost duration, terminating the boosting of the write current.

24. The method of claim 23, further comprising controlling a switching system to implement the boosting and the termination of the boosting of the write current.

25. The method of claim 24, further comprising:
activating a first part of the switching system to a first switch condition for charging an energy storage device to provide a first bias voltage based on the boost voltage, the first bias voltage causing the boosting of write current in the first direction; and
activating the first part of the switching system to as second switch condition for discharging the energy storage device to provide a lower first bias voltage, which causes the termination of the boosting of write current.

* * * * *